(12) United States Patent  (10) Patent No.: US 8,390,875 B2
Ogawara (45) Date of Patent: Mar. 5, 2013

(54) IMAGE PROCESSING APPARATUS, IMAGE FORMING APPARATUS, IMAGE PROCESSING METHOD, AND COMPUTER READABLE MEDIUM STORING PROGRAM

(75) Inventor: Osamu Ogawara, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 852 days.

(21) Appl. No.: 12/414,247

(22) Filed: Mar. 30, 2009

(65) Prior Publication Data

US 2010/0103434 A1 Apr. 29, 2010

(30) Foreign Application Priority Data

Oct. 24, 2008 (JP) ................................ 2008-274261

(51) Int. Cl.
G06K 15/02 (2006.01)
(52) U.S. Cl. .......... 358/1.2; 382/248; 382/298; 382/300
(58) Field of Classification Search ................... 358/1.2; 382/248, 300, 232, 233, 298
See application file for complete search history.

(56) References Cited

U.S. PATENT DOCUMENTS

| 5,995,665 | A * | 11/1999 | Maeda | 382/232 |
|---|---|---|---|---|
| 2004/0052432 | A1 * | 3/2004 | Lee et al. | 382/298 |
| 2005/0180658 | A1 * | 8/2005 | Curry et al. | 382/300 |
| 2008/0025625 | A1 * | 1/2008 | Ishizaka | 382/248 |

FOREIGN PATENT DOCUMENTS

| JP | A-58-097958 | 6/1983 |
|---|---|---|
| JP | A-03-253180 | 11/1991 |
| JP | A-06-348834 | 12/1994 |
| JP | A-8-214151 | 8/1996 |
| JP | A-2000-165661 | 6/2000 |
| JP | 2003283841 A * | 10/2003 |
| JP | A-2003-283841 | 10/2003 |
| JP | A-2005-301881 | 10/2005 |
| JP | A-2006-050090 | 2/2006 |
| JP | A-2008-54271 | 3/2008 |
| JP | A-2009-038632 | 2/2009 |

OTHER PUBLICATIONS

Japanese Office Action dated Oct. 6, 2010 in Japanese Application No. 2008.274261 (with translation).
Japanese Notification of Reasons of Refusal issued in Japanese Application No. 2008-274261 dated May 27, 2011. (with trans.).

* cited by examiner

Primary Examiner — Marivelisse Santiago Cordero
Assistant Examiner — Moustapha Diaby
(74) Attorney, Agent, or Firm — Oliff & Berridge, PLC

(57) ABSTRACT

An image processing apparatus includes: a coefficient calculation unit that calculates a coefficient for converting image data having a predetermined number of pixels to image data having a smaller number of pixels than the predetermined number of pixels, including a coefficient multiplied by an integer power of 2, as a conversion coefficient; a calculation unit that multiplies each pixel value of image data prior to image reduction processing by the conversion coefficient previously calculated by the coefficient calculation unit thereby to calculate each pixel value of the image data subjected to the image reduction processing; and a shift unit that shifts each of the pixel values calculated by the calculation unit by a number of bits to counteract the integer power of 2-multiplied coefficient included in the conversion coefficient.

7 Claims, 15 Drawing Sheets

FIG. 6

| ATTRIBUTE OF EACH PIXEL OF INPUT IMAGE DATA | CONVERSION COEFFICIENT (K[in]) |
|---|---|
| HEADING | FULL |
| MAX | |
| EDGING | |
| ENDING | |
| the OTHERS | $\alpha$ - FULL × N - (CARRY-OVER) |

$$\text{FULL} = \alpha \times \frac{\text{NUMBER OF OUTPUT PIXELS}}{\text{NUMBER OF INPUT PIXELS}} = \alpha \times \frac{6}{10}$$

$$\alpha = 2^{24}$$

CARRY-OVER: FULL−(CONVERSION COEFFICIENT OF PREVIOUS INPUT PIXEL WHEN ATTRIBUTE IS "the OTHERS")

N: NUMBER OF INPUT PIXELS WITH CONVERSION COEFFICIENT FULL INCLUDED IN 1 OUTPUT PIXEL

FIG. 7

COEFFICIENT TABLE

| in | CONVERSION COEFFICIENT K[in] |
|---|---|
| 0 | $\alpha \times 6/10$ |
| 1 | $\alpha \times 4/10$ |
| 2 | $\alpha \times 6/10$ |
| 3 | $\alpha \times 2/10$ |
| 4 | $\alpha \times 6/10$ |
| 5 | $\alpha \times 6/10$ |
| 6 | $\alpha \times 4/10$ |
| 7 | $\alpha \times 6/10$ |
| 8 | $\alpha \times 2/10$ |
| 9 | $\alpha \times 6/10$ |

$$\alpha = 2^{24}$$

FIG. 10A $M[0] = A[0] \times K[0] + A[1] \times K[1]$ $M[1] = A[1] \times (FULL - K[1]) + A[2] \times K[2] + A[3] \times K[3]$ $M[2] = A[3] \times (FULL - K[3]) + A[4] \times K[4]$ $M[3] = A[5] \times K[5] + A[6] \times K[6]$ $M[4] = A[6] \times (FULL - K[6]) + A[7] \times K[7] + A[8] \times K[8]$ $M[5] = A[8] \times (FULL - K[8]) + A[9] \times K[9]$

FIG. 10B $M[0] = (A[0] \times 6/10 + A[1] \times 4/10) \times \alpha$ $M[1] = (A[1] \times 2/10 + A[2] \times 6/10 + A[3] \times 2/10) \times \alpha$ $M[2] = (A[3] \times 4/10 + A[4] \times 6/10) \times \alpha$ $M[3] = (A[5] \times 6/10 + A[6] \times 4/10) \times \alpha$ $M[4] = (A[6] \times 2/10 + A[7] \times 6/10 + A[8] \times 2/10) \times \alpha$ $M[5] = (A[8] \times 4/10 + A[9] \times 6/10) \times \alpha$

FIG. 14
MONOCHROME BINARY IMAGE (8 PIXELS)
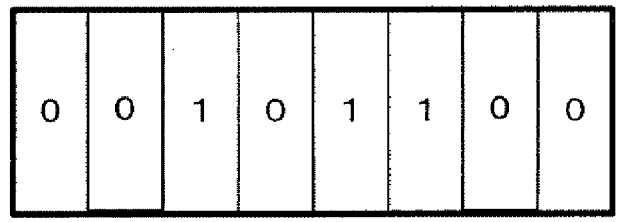
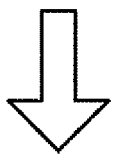
AREA TONE REPRODUCTION PROCESSING
MONOCHROME MULTIVALUED
IMAGE (1 PIXEL)
(8 BITS 256 GRAY LEVELS)
WHEN THE NUMBER OF BLACK PIXELS IN 8-BIT WINDOW IS 3, THE NUMBER OF GRAY LEVELS OF THE MULTIVALUED IMAGE IS 95.
$$3 \times \frac{255}{8} \fallingdotseq 95$$

DIVIDE-AND-CONQUER METHOD (AREA TONE REPRODUCTION IN 8-BIT WINDOW)
FIG. 15A
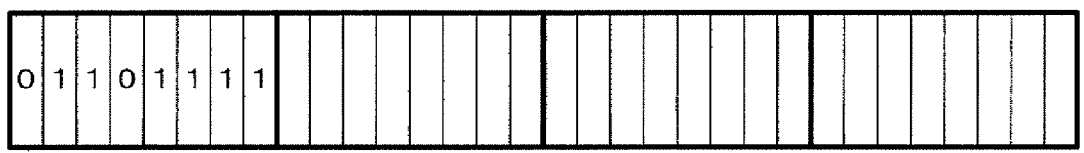
ADD ADJACENT BITS
FIG. 15B
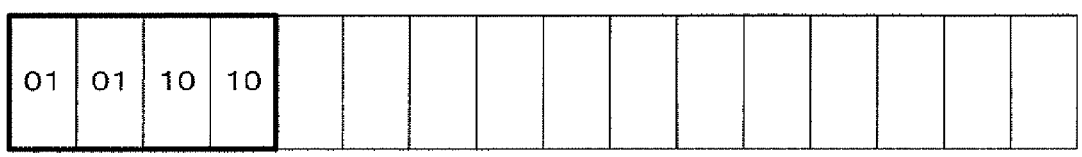
ADD ADJACENT 2 BITS
FIG. 15C
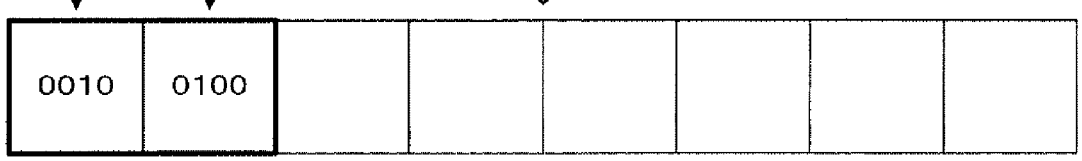
ADD ADJACENT 4 BITS
FIG. 15D
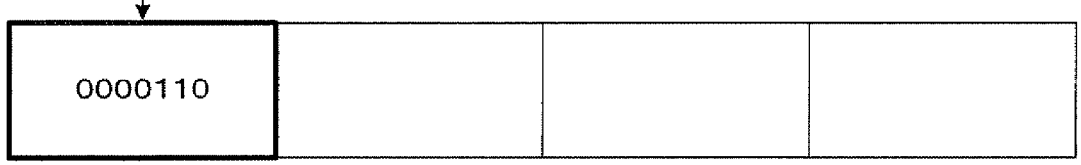
0000110=6(DECIMAL NOTATION)
THAT IS, THE NUMBER OF BLACK
PIXELS IN 8-BIT WINDOW IS 6

IMAGE PROCESSING APPARATUS, IMAGE FORMING APPARATUS, IMAGE PROCESSING METHOD, AND COMPUTER READABLE MEDIUM STORING PROGRAM

CROSS-REFERENCE TO RELATED APPLICATIONS

This application is based on and claims priority under 35 USC 119 from Japanese Patent Application No. 2008-274261 filed Oct. 24, 2008.

BACKGROUND

1. Technical Field

The present invention relates to an image processing apparatus, an image forming apparatus, an image processing method, and a computer readable medium storing a program.

SUMMARY

According to an aspect of the invention, there is provided an image processing apparatus including: a coefficient calculation unit that calculates a coefficient for converting image data having a predetermined number of pixels to image data having a smaller number of pixels than the predetermined number of pixels, including a coefficient multiplied by an integer power of 2, as a conversion coefficient; a calculation unit that multiplies each pixel value of image data prior to image reduction processing by the conversion coefficient previously calculated by the coefficient calculation unit thereby to calculate each pixel value of the image data subjected to the image reduction processing; and a shift unit that shifts each of the pixel values calculated by the calculation unit by a number of bits to counteract the integer power of 2-multiplied coefficient included in the conversion coefficient.

BRIEF DESCRIPTION OF THE DRAWINGS

An exemplary embodiment of the present invention will be described in detail based on the following figures, wherein:

FIG. 6 is an explanatory view showing a condition for setting a conversion coefficient based on an attribute of an input pixel;

FIG. 7 is an example of a coefficient table based on calculated conversion coefficients;

FIGS. 10A and 10B show expressions for calculation of the intermediate data M[0] to M[5];

FIG. 14 is an explanatory view showing the area tone reproduction processing in an 8-bit window; and FIGS. 15A to 15D are explanatory views showing operations upon calculation of the number of black pixels by the divide-and-conquer method.

DETAILED DESCRIPTION

Figure 1:
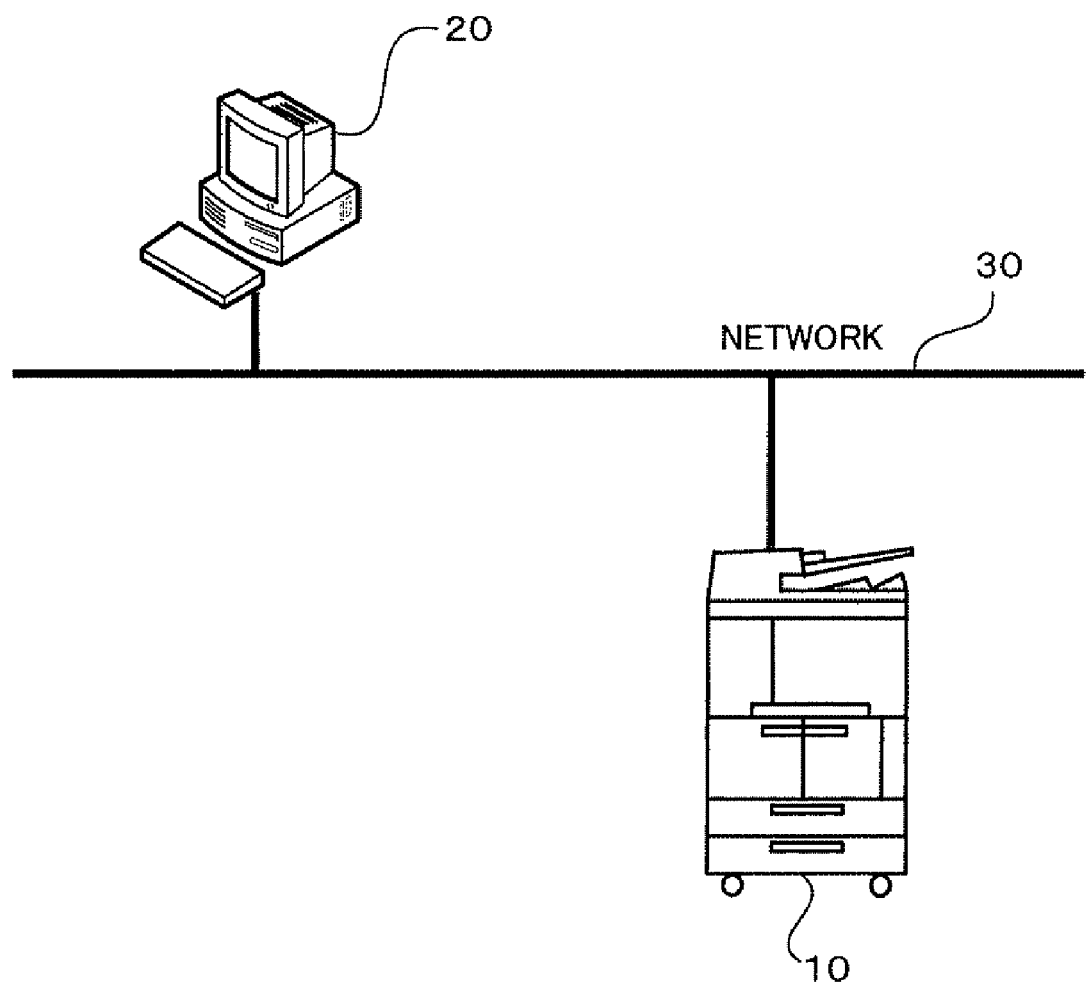
FIG. 1 is a block diagram showing a system configuration of an image forming apparatus according to an exemplary embodiment of the present invention.

Next, an exemplary embodiment of the present invention will be described in detail based on the drawings. FIG. 1 is a block diagram showing a configuration of an image forming system according to the exemplary embodiment of the present invention.

As shown in FIG. 1, the image forming system according to the exemplary embodiment of the present invention has an image forming apparatus 10 and a terminal device 20 interconnected via a network 30. The terminal device 20 generates print data, and transmits the generated print data via the network 30 to the image forming apparatus 10. The image forming apparatus 10 receives the print data transmitted from the terminal device 20 and outputs an image corresponding to the print data on a print sheet. Note that the image forming apparatus 10 is a so-called multi-function apparatus having plural functions such as a printing function, a scanning function, a duplication (copying) function and a facsimile function.

Figure 2:
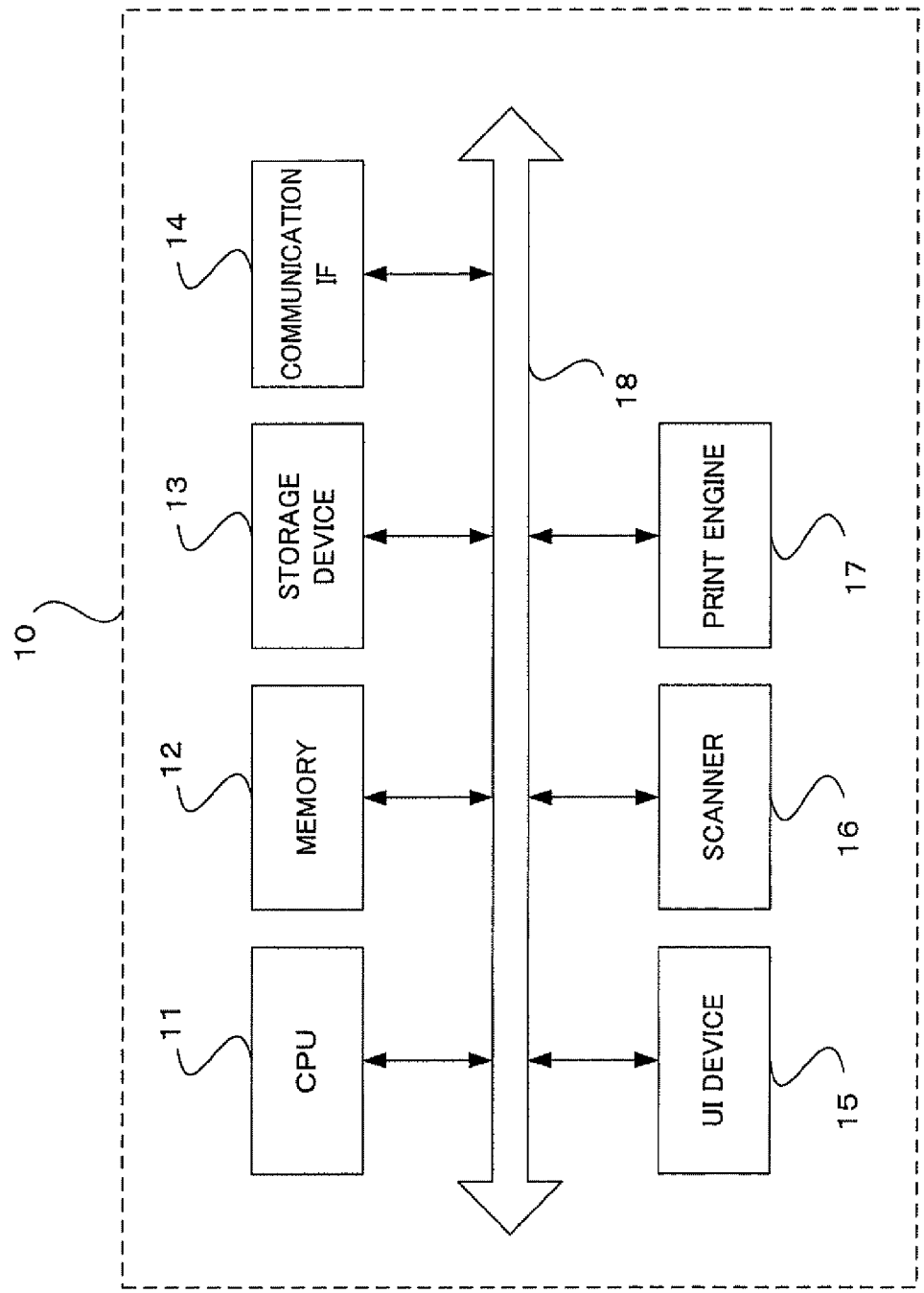
FIG. 2 is a block diagram showing a hardware configuration of an image forming apparatus 10 in the exemplary embodiment of the present invention.

Next, FIG. 2 shows a hardware configuration of the image forming apparatus 10 in the image forming system in the present exemplary embodiment.

As shown in FIG. 2, the image forming apparatus 10 has a CPU 11, a memory 12, a storage device 13 which is a hard disk drive (HDD) or the like, a communication interface (IF) 14 to perform data transmission/reception with an external device or the like via the network 30, a user interface (UI) device 15 including a touch panel or a liquid crystal display and a keyboard, a scanner 16, and a print engine 17. These constituent elements are interconnected via a control bus 18.

The CPU 11 performs predetermined processing based on a control program stored in the memory 12 or the storage device 13, to control the operation of the image forming apparatus 10. Note that in the present exemplary embodiment, the CPU 11 reads the control program stored in the memory 12 or the storage device 13 and executes the program; however, it may be arranged such that the program is stored on a storage medium such as a CD-ROM and provided to the CPU 11.

Figure 3:
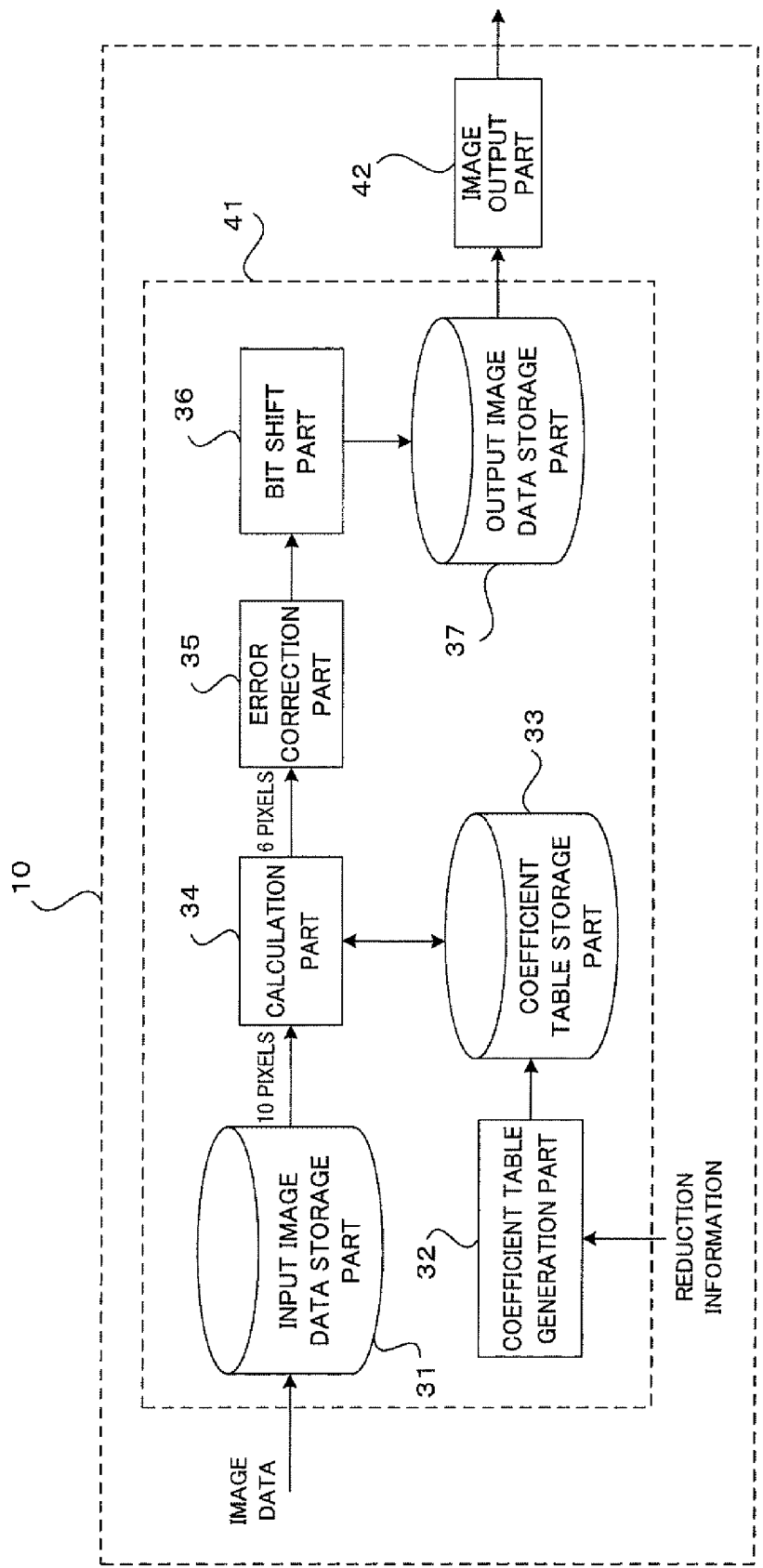
FIG. 3 is a block diagram showing a functional configuration of the image forming apparatus 10 in the exemplary embodiment of the present invention.

FIG. 3 is a block diagram showing a functional configuration of the image forming apparatus 10 realized by execution of the above-described control program.

As shown in FIG. 3, the image forming apparatus 10 in the present exemplary embodiment has an image processing device 41 for performing image processing on various images and an image output part 42. Further, the image processing device 41 has an input image data storage part 31, a coefficient table generation part 32, a coefficient table storage part 33, a calculation part 34, an error correction part 35, a bit shift part 36, and an output image data storage part 37.

The input image data storage part 31 holds image data prior to image reduction processing as input image data.

The coefficient table generation part 32 functions as a coefficient calculation unit to previously calculate a coefficient for converting image data having a predetermined number of pixels to image data having a smaller number of pixels than the predetermined number of pixels, including a coefficient multiplied by an integer power of 2, as a conversion coefficient. The coefficient table generation part 32 stores the calculated conversion coefficients, as a coefficient table, into the coefficient table storage part 33. The coefficient table storage part 33 holds the coefficient table generated by the coefficient table generation part 32.

The calculation part 34 multiplies each pixel value of image data prior to image reduction processing by the conversion coefficient generated by the coefficient table generation part 32 and stored in the coefficient table storage part 33, thereby calculates each pixel value of the image data subjected to the image reduction processing. Further, when the input image data represents a monochrome binary image and the reduction ratio is twice or more and the reduction ratio is not an integer power of 2 (2, 4, 8, 16 . . . ), the calculation part 34 converts the input image data to multivalued image data at a reduction ratio as an integer power of 2 by area tone reproduction processing, then calculates each pixel value of the image data subjected to the image reproduction processing. When the input image data represents a monochrome binary image and the reduction ratio is an integer power of 2, the target reduction ratio can be realized only by the area tone reproduction processing.

The error correction part 35 performs error correction on each of the pixel values of the image data subjected to the image reduction processing calculated by the calculation part 34 by adding "1" to a bit corresponding to a 0.5-pixel value.

The bit shift part 36 shifts each pixel value, calculated by the calculation part 34 and subjected to the error correction by the error correction part 35, by a number of bits to counteract the integer power of 2-multiplied coefficient included in the conversion coefficient. The output image data storage part 37 holds the image data processed by the bit shift part 36, as output image data.

The image output part 42 outputs an image based on the image data processed by the image processing device 41.

Next, the operation of the image forming apparatus 10 in the image forming system in the present exemplary embodiment will be described in detail based on the drawings.

The image reduction processing by the image forming apparatus 10 in the present exemplary embodiment is used for generation of a thumbnail image added to scan-read image data when transferred to a personal computer (PC) or the like, and for generation of an image having a resolution corresponding to the standard of a facsimile machine for facsimile transmission, in addition to reduction of an image to be printed. Further, the image reduction processing by the image forming apparatus 10 is also used upon image reading using an OCR (Optical Character Reader) or the like for reduction of read image data to a lower resolution image data for reduction of an OCR memory.

Figure 4:
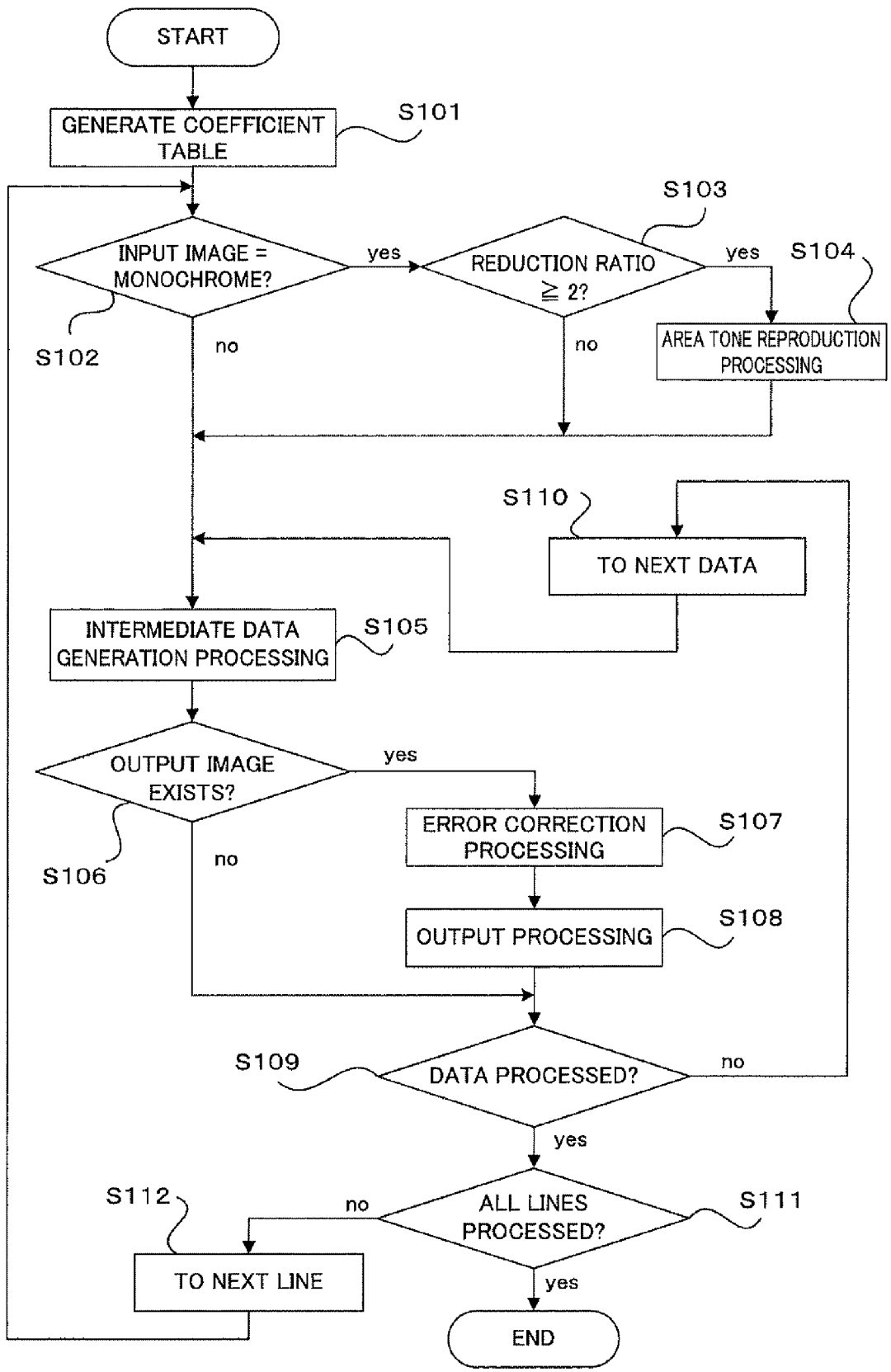
FIG. 4 is a flowchart showing the entire operation of image reduction processing by an image processing device 41 in the exemplary embodiment of the present invention.

First, the entire operation of the image reduction processing by the image processing device 41 in the exemplary embodiment is shown in the flowchart of FIG. 4.

During image reduction processing, first, the coefficient table generation part 32 generates a coefficient table in which a conversion coefficient is set for each input pixel, based on reduction information on a reduction ratio (step S101). The coefficient table generated by the coefficient table generation part 32 is stored in the coefficient table storage part 33.

Note that when an input image is a monochrome image (step S102) and the reduction ratio is 2 or higher (step S103), the calculation part 34 performs the area tone reproduction processing to convert the binary monochrome image to a multivalued monochrome image (step S104). Note that the area tone reproduction processing will be described later and not described here.

Next, a particular method for generation of the coefficient table will be described. In the present exemplary embodiment, input image data is converted, by 10 pixels, to 6 pixels, in the image reduction processing. In the image reduction processing, input image data is reduced by repeating processing to convert a pixel string having 10 pixels to a pixel string having 6 pixels.

Figure 5:
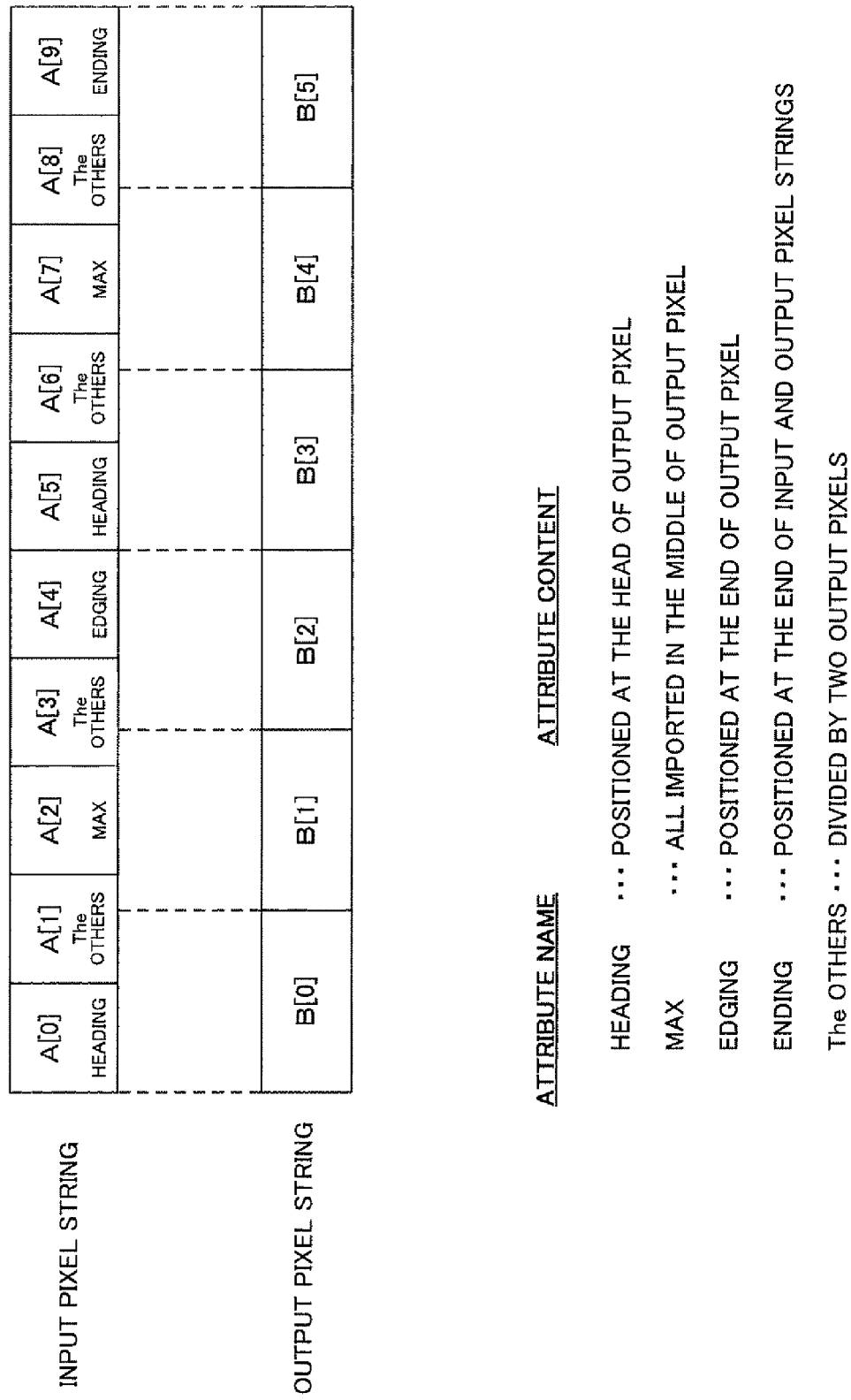
FIG. 5 is an explanatory view showing a particular example of the image reduction processing when input image data is converted, by 10 pixels, to 6 pixels.

More particularly, as shown in FIG. 5, a 10-pixel string A[0] to A[9] is sequentially read from the input image data, and converted to a 6-pixel output pixel string B[0] to B[5].

To calculate conversion coefficients and generate a coefficient table, first, an attribute of each input pixel is determined from the correspondence between the input pixel and an output pixel. The attribute represents how the input pixel is reflected in the output pixel, the position of the input pixel in various pixels, and the like.

For example, when an input pixel is positioned at the head of an output pixel, the attribute of the input pixel is set to "HEADING". Further, when an input pixel is all imported not at the head/end but in the middle of an output pixel, the attribute of the input pixel is set to "MAX". Further, when an input pixel is positioned at the end of an output pixel, the attribute of the input pixel is set to "EDGING". Further, when an input pixel is positioned at the end of the input pixel string and the output pixel string, the attribute of the input pixel is set to "ENDING". When an input pixel is other than the pixels having the above attributes, that is, 1 input pixel is divided by 2 output pixels, the attribute of the input pixel is set to "the OTHERS".

In the example shown in FIG. 5, the attributes of the input pixels A[0] and A[5] are set to "HEADING", the attributes of the input pixels A[1], A[3], A[6] and A[8] are set to "the OTHERS", and the attributes of the input pixels A[2] and A[7] are set to "MAX". Further, the attribute of the input pixel A[4] is set to "EDGING", and the attribute of the input pixel A[9] is set to "ENDING".

After the attribute determination, conversion coefficients are set based on the attributes of the respective input pixels on a condition as shown in FIG. 6.

First, regarding the respective input pixels having the attributes determined as "HEADING", "MAX", "EDGING" and "ENDING", since the pixels are imported in the output pixels without being divided, a conversion coefficient "FULL" is set.

Note that the conversion coefficient "FULL" is a coefficient set for an input pixel all the pixel values of which are imported in an output pixel, calculated from the following expression.

$$\text{FULL} = \alpha \times (\text{number of output pixels/number of input pixels})$$

Note that the alphabet $\alpha$ is an integer power of 2-multiplied coefficient included in the conversion coefficient to unnecessitate decimal point arithmetic. When the value of the coefficient $\alpha$ is greater, the precision of the image reduction processing is improved. However, when the pixel value is a maximum value and the value exceeds a processible value by the CPU, the pixel calculation goes wrong and an image is broken. Accordingly, a value having allowance to represent a pixel value is required as the value of the coefficient α. For example, when a pixel value is represented by 256 gray levels, a value having allowance for 8 bits in 256 gray level representation and having a maximum value in the processing unit by the CPU is set as the value of the coefficient α. Further, for example, when the arithmetic processing is performed using a 32-bit CPU for arithmetic processing by 32 bits, the coefficient α is set to $2^{24}$ (32−8=24). Further, when the arithmetic processing is performed using a 64-bit CPU, the coefficient α is set to $2^{56}$ (64−8=56). Note that in the present exemplary embodiment, since the image processing is performed using a 32-bit CPU, the coefficient α is set to $2^{24}$ in the following description.

In the example shown in FIG. 5, as the number of input pixels is 10 and the number of output pixels is 6, FULL=α×(6/10) holds.

Next, a conversion coefficient is set for the input pixel with the attribute determined as "the OTHERS". Regarding the input pixel with the attribute determined as "the OTHERS", as shown in FIG. 6, α-FULL×N-(carry-over) is set as a conversion coefficient. Note that the alphabet N is the number of input pixels included in 1 output pixel and with a conversion coefficient set to "FULL". Further, as the carry-over, FULL-(conversion coefficients of previous input pixels with attribute "the OTHERS") holds.

FIG. 7 shows an example of the coefficient table based on the conversion coefficients calculated as above.

In FIG. 7, α×6/10 is set as a conversion coefficient K[0] for the input pixel A[0]; α×4/10 is set as a conversion coefficient K[1] for the input pixel A[1]; α×6/10 is set as a conversion coefficient K[2] for the input pixel A[2]; α×2/10 is set as a conversion coefficient K[3] for the input pixel A[3]; and α×6/10 is set as a conversion coefficient K[4] for the input pixel A[4]. The conversion coefficients K[5] to K[9] for the input pixels A[5] to A[9] are the same values as the conversion coefficients K[0] to K[4].

Note that the conversion coefficient K[1] in the input pixel A[1] with the attribute determined as "the OTHERS" is calculated by the following expression.

$$A[1]=α×(6/10)×1-0=α×4/10$$

In the case of the input pixel A[1], since the input pixel(s) having the conversion coefficient FULL among input pixels imported in the output pixel B[0] is only the input pixel A[0], N=1 holds. In this input pixel string, since previous input pixel(s) with the attribute "the OTHERS" does not exist, (carry-over)=0 holds.

Further, the conversion coefficient K[3] in the input pixel A[3] with the attribute determined as "the OTHERS" is calculated by the following expression.

$$A[3]=α-α×(6/10)×1-α×(2/10)=α×4/10$$

In the case of the input pixel A[3], since the input pixel(s) having the conversion coefficient FULL among input pixels imported in the output pixel B[1] is only the input pixel A[2], N=1 holds. In this input pixel string, since previous input pixel(s) with the attribute "the OTHERS" is the input pixel A[1] and is imported in the output pixel [V0] by its conversion coefficient K[1], (carry-over)=α−K[1]=α−α×(4/10)=α×(2/10) holds.

In this manner, the conversion coefficients K[0] to K[9] corresponding to the respective input pixels A[0] to A[9] are sequentially calculated, thereby a conversion table as shown in FIG. 7 can be obtained.

The conversion table is set such that when conversion coefficients for plural input pixels constituting 1 output pixel are added, α×(10/10)=α holds. As it is understood from FIG. 7, all the conversion coefficients K[0] to K[9] include α as an integer power of 2-multiplied coefficient.

Figure 8:
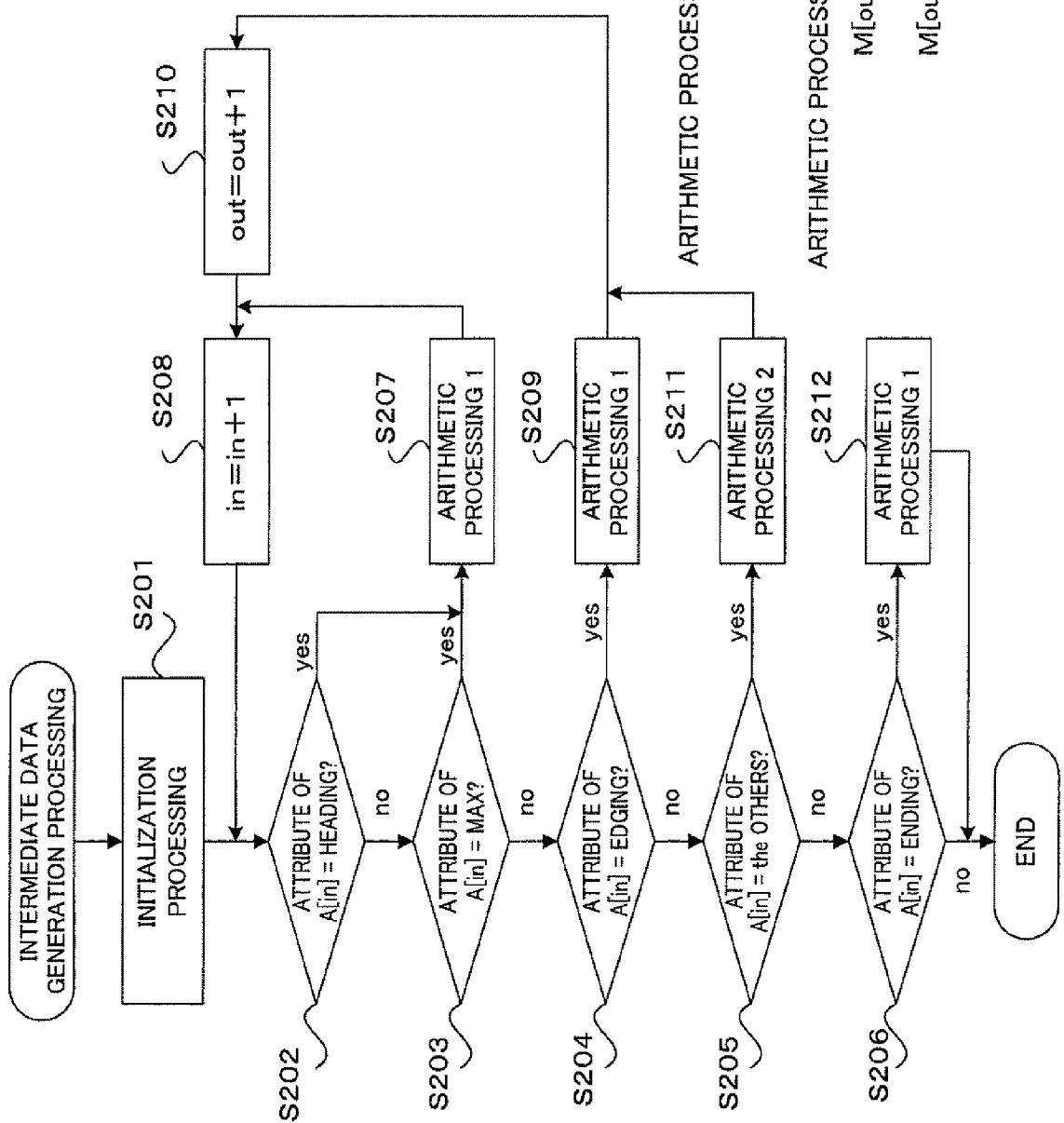
FIG. 8 is a flowchart showing a particular method of intermediate data generation processing.

Next, returning to the flowchart of FIG. 4, the calculation part 34 performs intermediate data generation processing (step S105) based on the coefficient table stored in the coefficient table storage part 33. FIG. 8 is a flowchart showing a particular method of the intermediate data generation processing.

Figure 9:
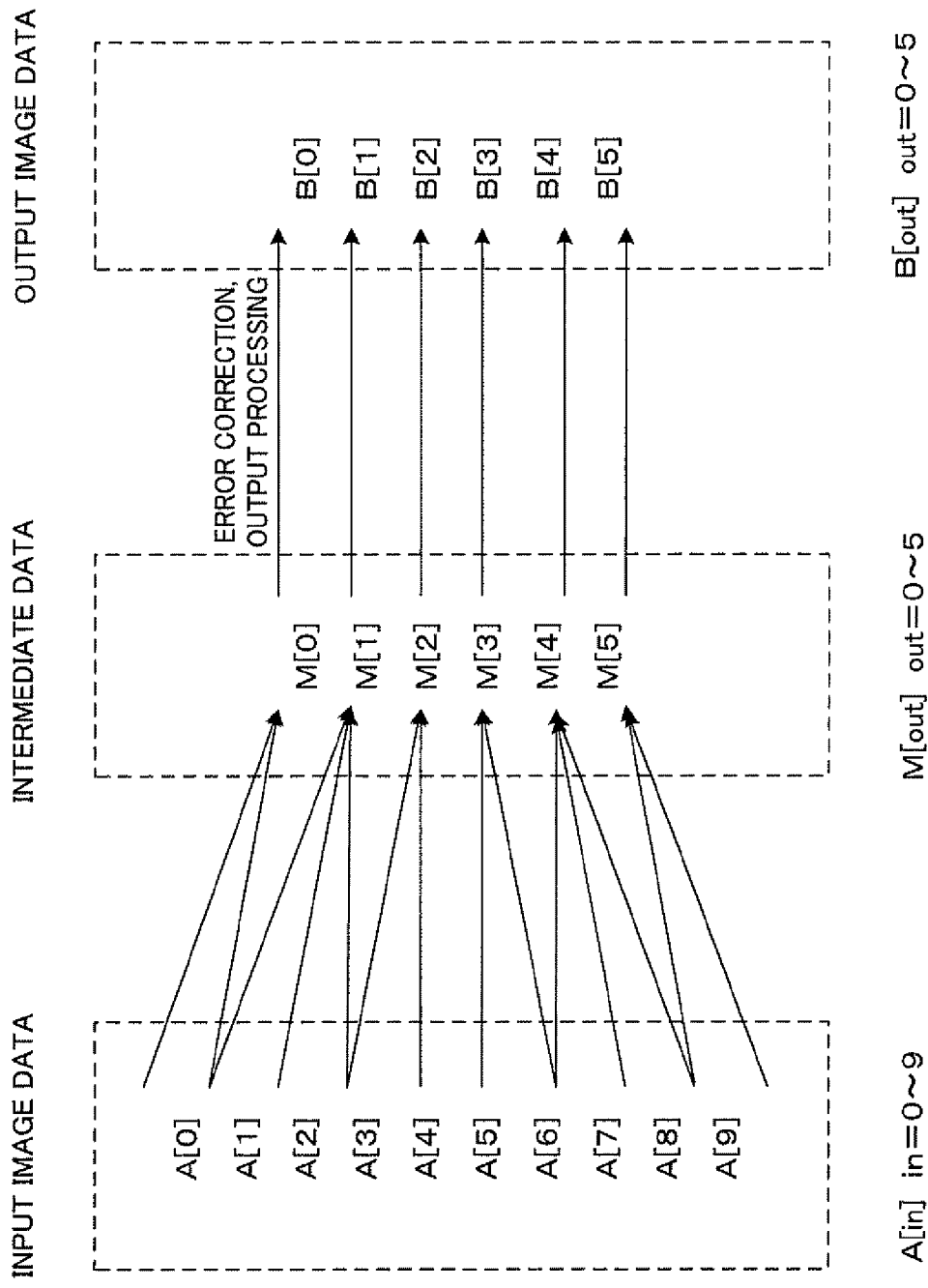
FIG. 9 is an explanatory view showing the relation among input pixels A[0] to A[9]/intermediate data M[0] to M[5], and output pixels B[0] to B[5]

The intermediate data is data temporarily generated during conversion of an input pixel to an output pixel. As shown in FIG. 9, in the present exemplary embodiment, 6 pieces of intermediate data M[0] to M[5] one-to-one corresponding to the output pixels B[0] to B[5] are used.

In the intermediate data generation processing, the calculation part 34 first performs processing to clear values of "in" indicating an input pixel position, "out" indicating an output pixel position and values of the intermediate data M[0] to M[9] as initialization processing (step S201). The initialization processing is performed once by line.

Then, it is determined whether the attribute of the input pixel A[in] to be processed is "HEADING", "MAX", "EDGING", "the OTHERS" or "ENDING" (steps S202 to S206).

In this example, since in=0 holds, it is determined that the attribute of the input pixel A[0] is "HEADING" (step S202). Accordingly, the calculation part 34 performs processing (arithmetic processing 1) to add A[0]×K[0] to the intermediate data M[0] (step S207). Then, 1 is added to the value of "in" indicating the input pixel position and the value becomes "1" (step S208) (The processing at this step S208 corresponds to step S110 in the flowchart of FIG. 4).

Next, since in=1 holds, it is determined that the attribute of the input pixel A[1] is "the OTHERS" (step S205). Accordingly, the calculation part 34 performs processing (arithmetic processing 2) to add A[1]×K[1] to the intermediate data M[0] and add A[1]×(FULL−K[1]) to the intermediate data M[1] (step S211). Then, 1 is added to the value of "out" indicating the output pixel position and the value becomes "1" (step S210), and 1 is added to the value of "in" indicating the input pixel position and the value becomes "2" (step S208).

Next, since in=2 holds, it is determined that the attribute of the input pixel A[2] is "MAX" (step S203). Accordingly, the calculation part 34 performs processing (arithmetic processing 1) to add A[2]×K[2] to the intermediate data M[1] (step S207). Then, 1 is added to the value of "in" indicating the input pixel position and the value becomes "3" (step S208).

Next, since in=3 holds, it is determined that the attribute of the input pixel A[1] is "the OTHERS" (step S205). Accordingly, the calculation part 34 performs processing (arithmetic processing 2) to add A[3]×K[3] to the intermediate data M[1] and add A[3]×(FULL−K[3]) to the intermediate data M[2] (step S211). Then, 1 is added to the value of "out" indicating the output pixel position and the value becomes "2" (step S210), and 1 is added to the value of "in" indicating the input pixel position and the value becomes "4" (step S208).

Next, since in=4 holds, it is determined that the attribute of the input pixel A[4] is "EDGING" (step S204). Accordingly, the calculation part 34 performs processing (arithmetic processing 1) to add A[4]×K[4] to the intermediate data M[2] (step S209). Then 1 is added to the value of "in" indicating the input pixel position and the value becomes "5" (step S208).

Similar processing is repeated regarding in=5 to 8. When in=9 holds, it is determined that the attribute of the input pixel A[9] is "ENDING" (step S206). Accordingly, the calculation part 34 performs processing (arithmetic processing 1) to add A[9]×K[9] to the intermediate data M[5] (step S212). Then, the intermediate data generation processing ends.

FIG. 10A shows the expressions of the intermediate data M[0] to M[5] calculated as above. When the values of the respective conversion coefficients K[0] to K[9] shown in FIG. 7 are substituted in these expressions of the intermediate data M[0] to M[5] shown in FIG. 10A, expressions shown in FIG. 10B are obtained. It is understood by reference to the expressions shown in FIG. 10B that when a conversion coefficient in an expression constituting 1 output pixel is added, $\alpha \times (10/10) = \alpha$ holds.

Returning to the flowchart of FIG. 4, the calculation part 34 determines the existence/absence of output pixel (step S106) in parallel with the above-described intermediate data generation processing. When an output pixel exists, the calculation part 34 sequentially outputs the pixel to the error correction part 35. The determination of existence/absence of output pixel is made based on the attribute of an input pixel. When the attribute of the input pixel is "EDGING", "the OTHERS" or "ENDING", it is determined that the arithmetic processing of 1 output pixel has been completed, then the value of the output pixel is outputted to the error correction part 35.

Next, the output pixel outputted by the calculation part 34 is subjected to the error correction processing by the error correction part 35 (step S107), then after the bit shift processing by a predetermined number of bits by the bit shift part 36, outputted to the output image data storage part 37 (step S108). Then, it is determined whether or not the conversion processing for all the 10 pixels has been completed (step S109). When it is determined that the conversion processing for all the 10-pixel input pixel string has not been completed, processing for the next data is performed (step S110). When it is determined at step S109 that the conversion processing for the 10-pixel input pixel string has been completed, the processing for this input pixel string ends.

When it is determined that the processing for all the lines of the image to be reduced has not been completed (NO at step S111), similar conversion processing is performed on the 10-pixel input pixel string in the next line (step S112). That is, for the 10-pixel input pixel string in the next line, the initialization processing at step S210 in the flowchart of FIG. 8 is performed, and similar conversion processing is performed using a conversion table similar to that generated at step S101 and the 10-pixel input pixel string in the next line. Then, when it is determined that the conversion processing for all the lines has been completed (YES at step S111), the processing ends.

Next, the error correction processing performed by the error correction part 35 and the bit shift processing performed by the bit shift part 36 will be described with reference to FIG. 11.

The error correction part 35 performs error correction on the value of an output pixel calculated by the calculation part 34 by adding 1 to a bit corresponding to 0.5 (½) pixel value. More particularly, since the actual pixel value of an output pixel is included in high-order 8 bits of each value outputted by the calculation part 34, the error correction part 35 adds 1 to the most significant bit of 24 bits indicating a decimal part, as a bit corresponding to 0.5 pixel value. That is, as the value corresponds to the 24th bit, the error correction part 35 adds $1 \times 2^{23}$ as an error correction value to the output pixel.

Figure 12A:
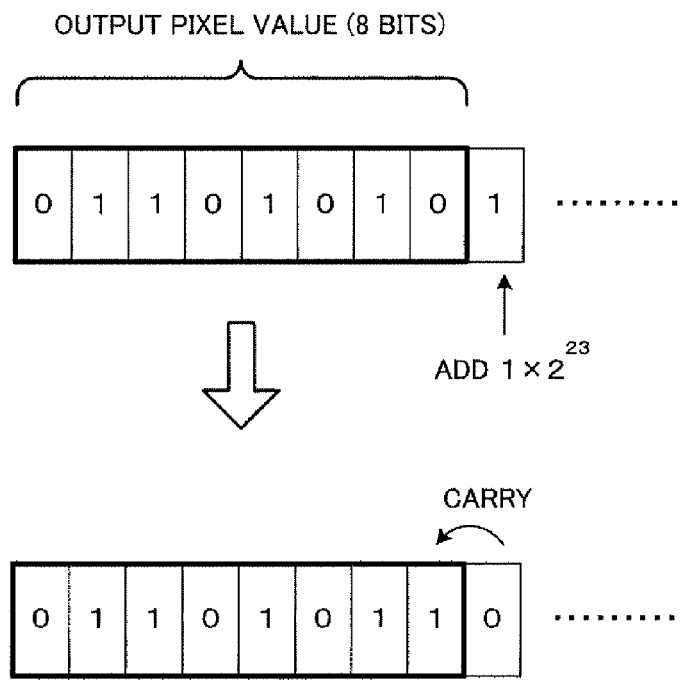
FIG. 12A is an explanatory view showing an example when a low-order bit of a pixel value of an output pixel is carried in the error correction processing.
Figure 12B:
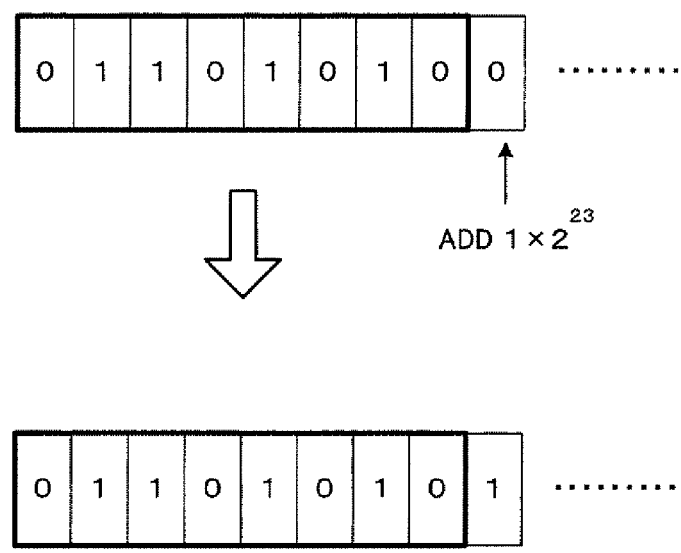
FIG. 12B is an explanatory view showing an example when the low-order bit of the pixel value of the output pixel is not carried in the error correction processing.

As shown in FIG. 12A, when the value of a low-order bit in 8 bits indicating a pixel value of an output pixel is "1", a carry is produced by addition of $1 \times 2^{23}$, and 1 is added to the pixel value of the output pixel. On the other hand, as shown in FIG. 12B, when the low-order bit in the 8 bits indicating the pixel value of the output pixel is "0", since a carry is not produced by addition of $1 \times 2^{23}$, the pixel value of the output pixel remains the same. That is, the addition of the error correction value $1 \times 2^{23}$ to the value outputted by the calculation part 34 is similar to processing to round off the decimal place of an actual pixel value.

Figure 11:
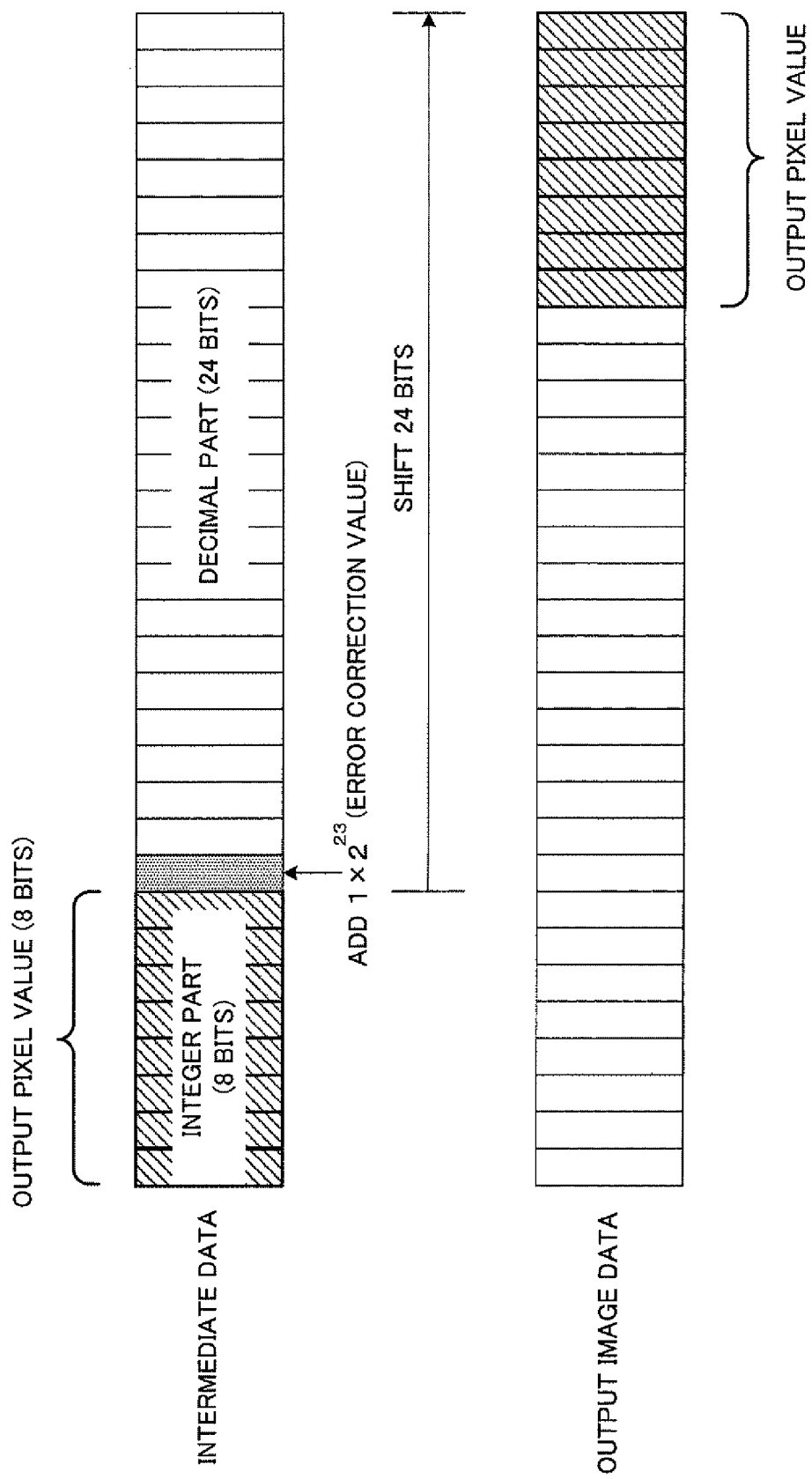
FIG. 11 is an explanatory view showing error correction processing performed by an error correction part 35 and bit shift processing performed by a bit shift part 36.

After such error correction processing, as shown in FIG. 11, the bit shift part 36 shifts each pixel value subjected to the error correction by the error correction part 35 by a number of bits to counteract the integer power of 2-multiplied coefficient included in the conversion coefficient, $\alpha(=2^{24})$, i.e., 24 bits.

That is, since the conversion coefficient includes the coefficient $\alpha$, $2^{24}$, as each pixel value outputted from the calculation part 34, actual pixel value $\times 2^{24}$ holds. This value is shifted by 24 bits by the bit shift part 36, thereby the actual pixel value itself can be obtained.

Note that in this example, to extract an actual pixel value from a value calculated by the calculation part 34, the value from the calculation part 34 is shifted by 24 bits. However, a method of directly extracting the higher-order 8 bits in the 32 bit value from the calculation part 34 may be used. When such method is used, an extraction unit to extract a part of each pixel value calculated by the calculation part 34 corresponding to an integer power of 2 coefficient included in the conversion coefficient by byte is used in place of the bit shift part 36. Note that the extraction unit can be used only when the coefficient $\alpha$ as an integer power of 2-multiplied coefficient is an 8 multiple power of 2 such as $2^8, 2^{16}, 2^{24}, \ldots$.

Figure 13:
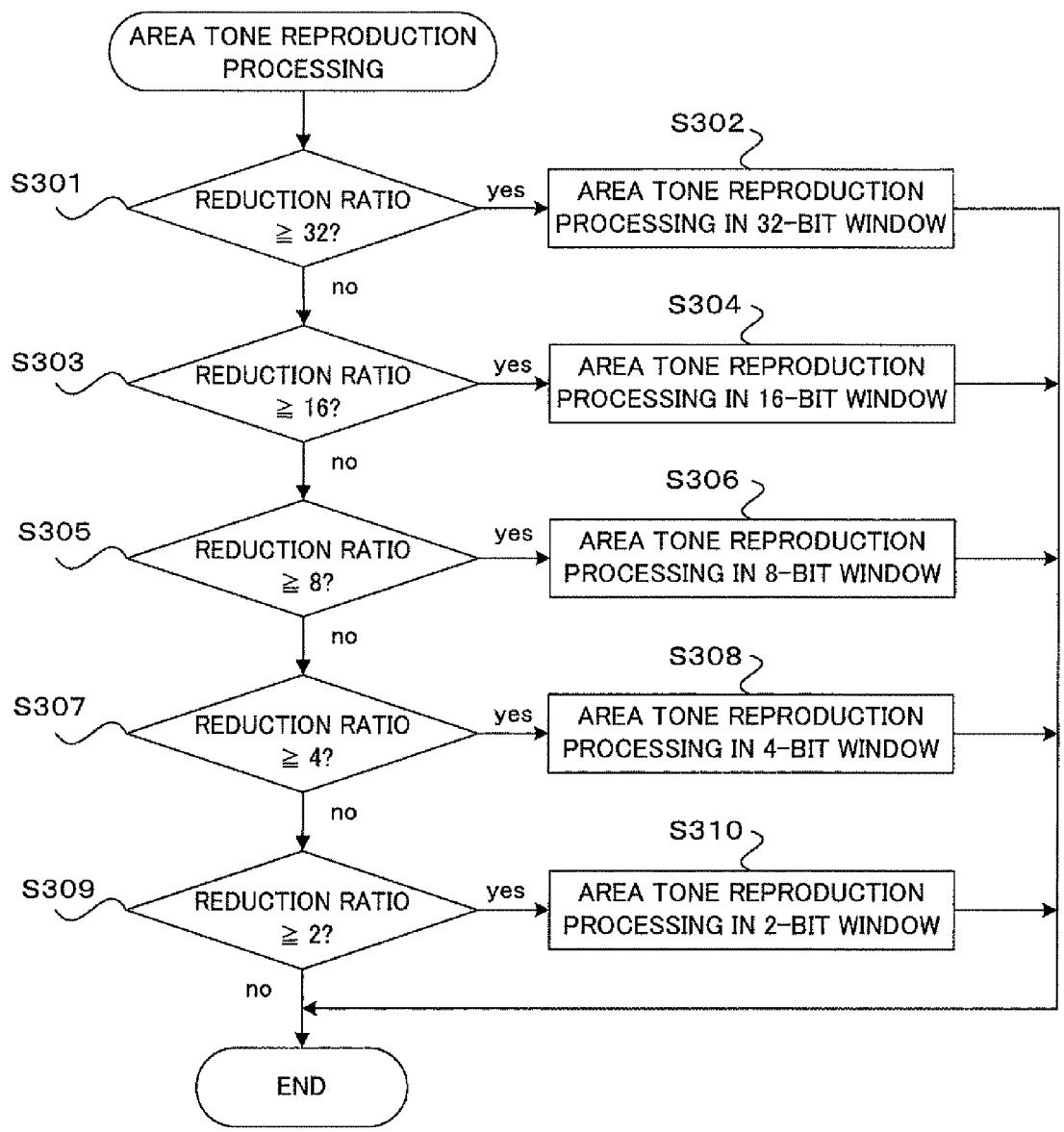
FIG. 13 is a flowchart showing a particular operation of area tone reproduction processing.

Next, the area tone reproduction processing (step S104), the explanation thereof is omitted in the flowchart of FIG. 4, will be described. The area tone reproduction processing is performed only when the reduction ratio for a monochrome binary image is twice or more. FIG. 13 is a flowchart showing a particular operation of the area tone reproduction processing.

It is determined whether or not the reduction ratio is 32 or higher (step S301), and when it is determined that the reduction ratio is 32 or higher, the area tone reproduction processing is performed in a 32-bit window (step S302). Next, it is determined whether or not the reduction ratio is 16 or higher (step S303), and when it is determined that the reduction ratio is 16 or higher, i.e., the reduction ratio is 16 to less than 32, the area tone reproduction processing is performed in a 16-bit window (step S304). Similarly, when it is determined that the reduction ratio is 8 to less than 16, the area tone reproduction processing is performed in an 8-bit window (step S305 or S306). When it is determined that the reduction ratio is 4 to less than 8, the tone area reproduction processing is performed in a 4-bit window (step S307 or S308). When it is determined that the reduction ratio is 2 to less than 4, the tone area reproduction processing is performed in a 2-bit window (step S309 or S310).

Next, the area tone reproduction processing in an 8-bit window will be described based on FIG. 14. An 8-bit window is sequentially set by 8 pixels of input image data, then the number of black pixels in the 8-bit window is counted, and a pixel value in the case of 256 gray levels is calculated based on the counted number of black pixels.

For example, as shown in FIG. 14, when an 8-pixel binary image in the 8-bit window is "00101100", as the number of black pixels in the 8-bit window is 3, since a pixel value corresponding to the 8 pixels, $3 \times 255/8 \cong 95$ holds.

As a method of calculating the number of black pixels in a predetermined bit-width window in the case of the area tone reproduction processing, high-speed processing can be realized by using the divide-and-conquer method.

FIGS. 15A to 15D show a particular example of the divide-and-conquer method. In FIGS. 15A to 15D, the area tone reproduction processing is performed in an 3-bit window.

In the divide-and-conquer method, first, processing to add adjacent bits is performed. More particularly, OR operation is performed between the result of AND operation between 32-bit data and data 010101010101 ... 101 (55555555 (hexadecimal number)) and the result of AND operation between data obtained by shifting the 32-bit data by 1 bit and the data 010101010101 ... 101 (55555555 (hexadecimal number)).

Next, processing to add adjacent 2 bits is performed. More particularly, OR operation is performed between the result of AND operation between the 32-bit data and data 00110011001100 ... 0011 (33333333 (hexadecimal number)) and the result of AND operation between data obtained by shifting the 32-bit data by 2 bits and the data 00110011001100 ... 0011 (33333333 (hexadecimal number)).

Finally, processing to add adjacent 4 bits is performed. More particularly, OR operation is performed between the result of AND operation between the 32-bit data and data 000011110000 ... 111 (0F0F0F0F (hexadecimal number)) and the result of AND operation between data obtained by shifting the 32-bit data by 4 bits and the data 000011110000 ... 1111 (0F0F0F0F (hexadecimal number)).

By the above operations, as shown in FIG. 15A, when data in an 8-bit window is "01101111", the data is finally converted to data "0000110" as shown in FIG. 15D, and the number of "1" bits (black pixels) in the 8-bit window is 6.

[Modification]

In the above-described exemplary embodiment, 10 pixel input image data is reduction-processed to 6-pixel data; however, the present invention is not limited to these numbers of pixels, but is applicable to any number of pixels prior/subsequent to the conversion. Further, in the above-describe exemplary embodiment, for the sake of simplification of explanation, the image reduction processing is performed by 1 line; however, the present invention is not limited to this arrangement. Even when the image reduction processing in two directions is simultaneously performed, the present invention can be similarly applied by respectively generating a coefficient table for the two directions.

Further, in the above-described exemplary embodiment, the coefficient table generation part 32 calculates conversion coefficients to convert a 10-pixel input pixel string to 6 pixels; however, it may be arranged such that the conversion coefficient is calculated for a particular pixel part in a predetermined number of pixels. The particular pixel part means a number of pixels constituting 1 line or a particular pattern.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a coefficient calculation unit that calculates a conversion coefficient for converting image data having a predetermined number of pixels to image data having a smaller number of pixels than the predetermined number of pixels, including a coefficient multiplied by an integer power of 2;
a calculation unit that multiplies each pixel value of image data prior to image reduction processing by the conversion coefficient previously calculated by the coefficient calculation unit thereby to calculate each pixel value of the image data subjected to the image reduction processing; and
a shift unit that shifts each of the pixel values calculated by the calculation unit by a number of bits to counteract the integer power of 2-multiplied coefficient included in the conversion coefficient,
wherein when input image data represent a binary image, a reduction ratio is twice or more and the reduction ratio is not an integer power of 2, the calculation unit converts the input image data to a multivalued image data at the reduction ratio as an integer power of 2 by area tone reproduction processing, and then calculates each pixel value of the image data subjected to the image reduction processing.

2. An image processing apparatus comprising:
a coefficient calculation unit that calculates a conversion coefficient for converting image data having a predetermined number of pixels to image data having a smaller number of pixels than the predetermined number of pixels, including a coefficient multiplied by an integer power of 2;
a calculation unit that multiplies each pixel value of image data prior to image reduction processing by the conversion coefficient previously calculated by the coefficient calculation unit thereby to calculate each pixel value of the image data subjected to the image reduction processing; and
an extraction unit that extracts a part of each pixel value calculated by the calculation unit corresponding to the integer power of 2-multiplied coefficient included in the conversion coefficient by byte,
wherein when input image data represent a binary image, a reduction ratio is twice or more and the reduction ratio is not an integer power of 2, the calculation unit converts the input image data to a multivalued image data at the reduction ratio as an integer power of 2 by area tone reproduction processing, and then calculates each pixel value of the image data subjected to the image reduction processing.

3. The image processing apparatus according to claim 1, further comprising an error correction unit that performs error correction on each pixel value of the image data subjected to the image reduction processing calculated by the calculation unit, by adding 1 to a bit corresponding to a 0.5-pixel value.

4. The image processing apparatus according to claim 1, wherein the coefficient calculation unit calculates a coefficient for converting image data having a predetermined number of pixels to image data having a smaller number of pixels than the predetermined number of pixels, including a coefficient multiplied by an integer power of 2, as a conversion coefficient, for a particular pixel of the predetermined number of pixels.

5. An image forming apparatus comprising:
an image processing apparatus having:
a coefficient calculation unit that calculates a conversion coefficient for converting image data having a predetermined number of pixels to image data having a smaller number of pixels than the predetermined number of pixels, including a coefficient multiplied by an integer power of 2;

a calculation unit that multiplies each pixel value of image data prior to image reduction processing by the conversion coefficient previously calculated by the coefficient calculation unit thereby to calculate each pixel value of the image data subjected to the image reduction processing; and a shift unit that shifts each of the pixel values calculated by the calculation unit by a number of bits to counteract the integer power of 2-multiplied coefficient included in the conversion coefficient, wherein when input image data represent a binary image, a reduction ratio is twice or more and the reduction ratio is not an integer power of 2, the calculation unit converts the input image data to a multivalued image data at the reduction ratio as an integer power of 2 by area tone reproduction processing, and then calculates each pixel value of the image data subjected to the image reduction processing; and an image output unit that outputs an image based on image data processed by the image processing apparatus.

6. An image processing method comprising:

calculating a conversion coefficient for converting image data having a predetermined number of pixels to image data having a smaller number of pixels than the predetermined number of pixels, including a coefficient multiplied by an integer power of 2;

multiplying each pixel value of image data prior to image reduction processing by the previously calculated conversion coefficient thereby to calculate each pixel value of the image data subjected to the image reduction processing; and shifting each of the calculated pixel values by a number of bits to counteract the integer power of 2-multiplied coefficient included in the conversion coefficient, wherein when input image data represent a binary image, a reduction ratio is twice or more and the reduction ratio is not an integer power of 2, the calculation unit converts the input image data to a multivalued image data at the reduction ratio as an integer power of 2 by area tone reproduction processing, and then calculates each pixel value of the image data subjected to the image reduction processing.

7. A non-transitory computer readable medium storing a program causing a computer to execute a process for image processing, the process comprising:

calculating a conversion coefficient for converting image data having a predetermined number of pixels to image data having a smaller number of pixels than the predetermined number of pixels, including a coefficient multiplied by an integer power of 2;

multiplying each pixel value of image data prior to image reduction processing by the previously calculated conversion coefficient thereby to calculate each pixel value of the image data subjected to the image reduction processing; and shifting each of the calculated pixel values by a number of bits to counteract the integer power of 2-multiplied coefficient included in the conversion coefficient, wherein when input image data represent a binary image, a reduction ratio is twice or more and the reduction ratio is not an integer power of 2, the calculation unit converts the input image data to a multivalued image data at the reduction ratio as an integer power of 2 by area tone reproduction processing, and then calculates each pixel value of the image data subjected to the image reduction processing.

* * * * *